(No Model.)

C. W. PIERCE.
STOVE PIPE DAMPER.

No. 255,531. Patented Mar. 28, 1882.

Witnesses:
O. H. Morgan
S. H. Morgan

Inventor.
Chas. W. Pierce
By A. P. Thayer
atty

UNITED STATES PATENT OFFICE.

CHARLES W. PIERCE, OF OAK HILL, NEW YORK.

STOVE-PIPE DAMPER.

SPECIFICATION forming part of Letters Patent No. 255,531, dated March 28, 1882.

Application filed August 9, 1881. (No model.)

*To all whom it may concern:*

Be it known that I, CHARLES W. PIERCE, of Oak Hill, Greene county, New York, have invented a new and useful Improvement in Stove-Pipe Dampers, of which the following is a specification.

My invention relates to an improved arrangement and contrivance of a spring with a stove-pipe damper for maintaining a pressure of the damper against the sides of the pipe to cause the damper to be held in any desired position by the friction of such pressure; and it consists of the said damper being split or divided in two parts at right angles to the axis, or thereabout, and said parts being connected together in the form and arrangement suitably for the purposes of a damper by a spring located in or about the dividing-line, forming part of the damper, and being adjusted so that when the damper is inserted in the pipe it will gently press the two parts against the sides of the pipe with sufficient tension to hold it by friction in any position in which it may be set. The method of connecting the spring with the damper which I prefer is to lay the spring in the mold previous to casting the damper, so that the molten metal will form on and around the ends of the spring when poured into the molds; but it may be riveted on, if preferred.

Figure 1:
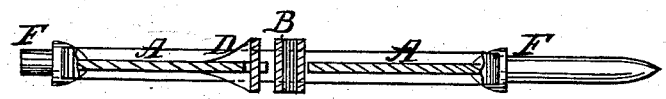
Figure 2:
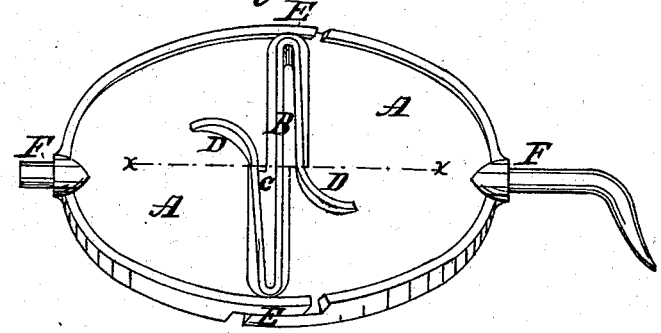

Figure 1 in the accompanying drawings is a transverse section of a damper constructed according to my invention. Fig. 2 is a perspective view of the same.

A represents two plates of half-round or equivalent form, constituting the main portion of the damper when connected together, which I propose to do by the springs B, arranged in the narrow slit or space C, traversing or nearly traversing them at right angles to the axis, or it may be at any line crossing the axis, which spring has its ends D, in this case, enveloped in the metal of the plates by casting it upon them, though they may, if desired, be riveted to the plates. At each end of the slit or space occupied by the spring the plates are provided with a circumferential extension, E, to overlap, so as to relieve the spring of the torsion of adjusting the damper, and as a protection to the spring in handling the damper before being put in place. It will be noticed that both extensions of one plate overlap those of the other plate on the same side, so as to relieve the spring of the torsion whichever way the damper is turned. The pivots F are arranged on the plates, respectively, and in the usual form, one having a small crank for turning the damper.

The damper may be constructed with this intervening and connecting spring between the two parts without the overlapping circumferential extensions E, if desired; but it is preferred to make use of them. To avoid the joining of the metal of these extensions when casting the plates, the spring may have such expansion as to separate them far enough for a sand partition between them in the mold, after which the spring may be set so as to maintain the overlapping of the extensions; or the two parts may be cast at different times.

The form of the spring may vary as preferred, also the location of the attaching ends; but it is believed to be the best to locate said ends near about the axis and coincident with the pivots, as here shown, and extend the spring each way therefrom toward the periphery, near where it turns abruptly and traverses the whole length of the space C by a middle bar.

Having thus described my invention, what I claim, and desire to secure by Letters Patent, is—

1. The improved damper herein described, the plate of which is made in two separate parts, A, and united by the spring B, having its ends connected to said plates, respectively, substantially as described.

2. The combination of the circumferential overlapping lugs E with the plate of a stove-pipe damper, made in two separate parts, A, and united by a spring, B, having its ends respectively connected to said parts, substantially as described.

CHARLES W. PIERCE.

Witnesses:
IRA D. HUMPHRY,
E. O. PIERCE.